Patented Aug. 20, 1946

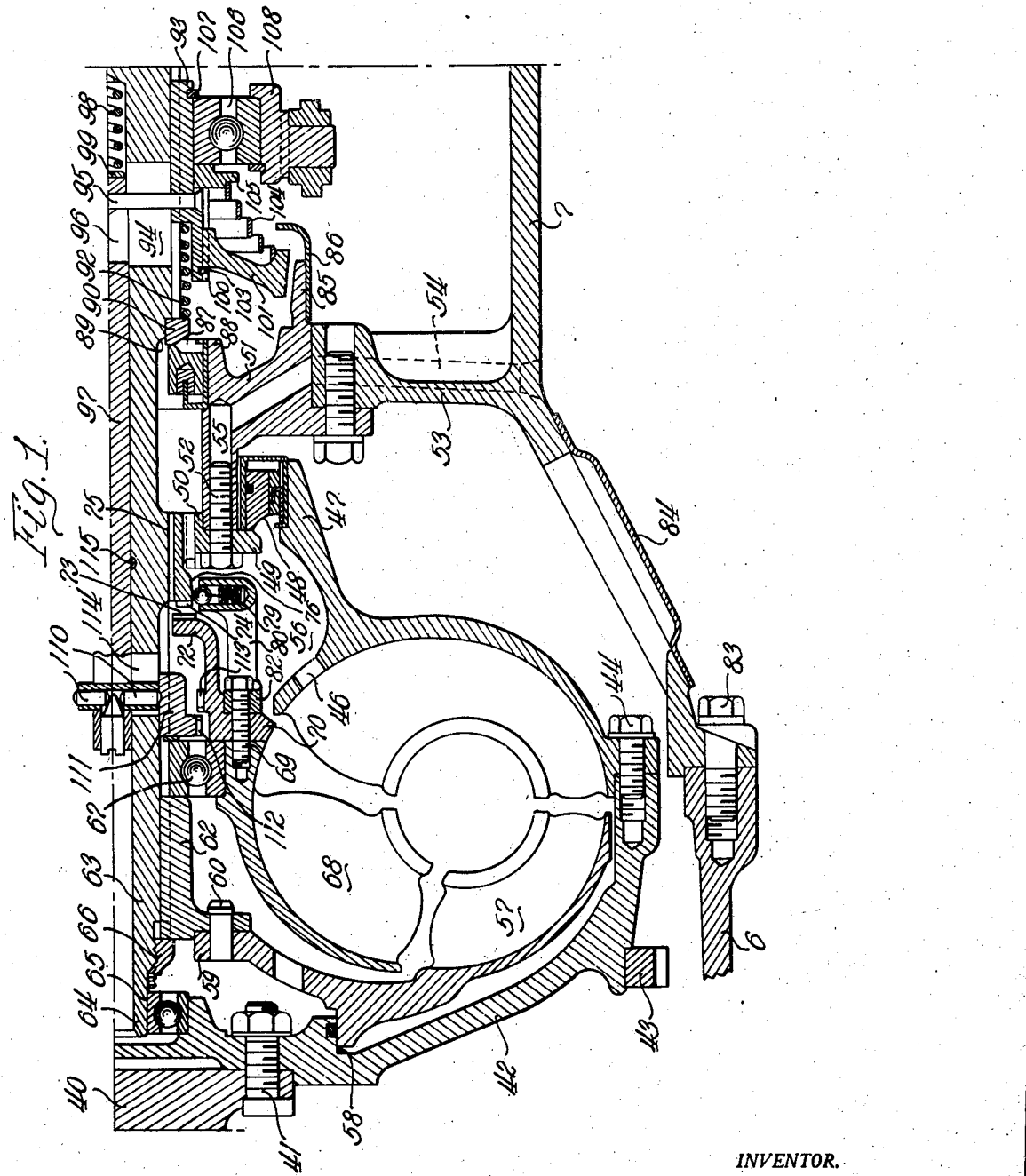

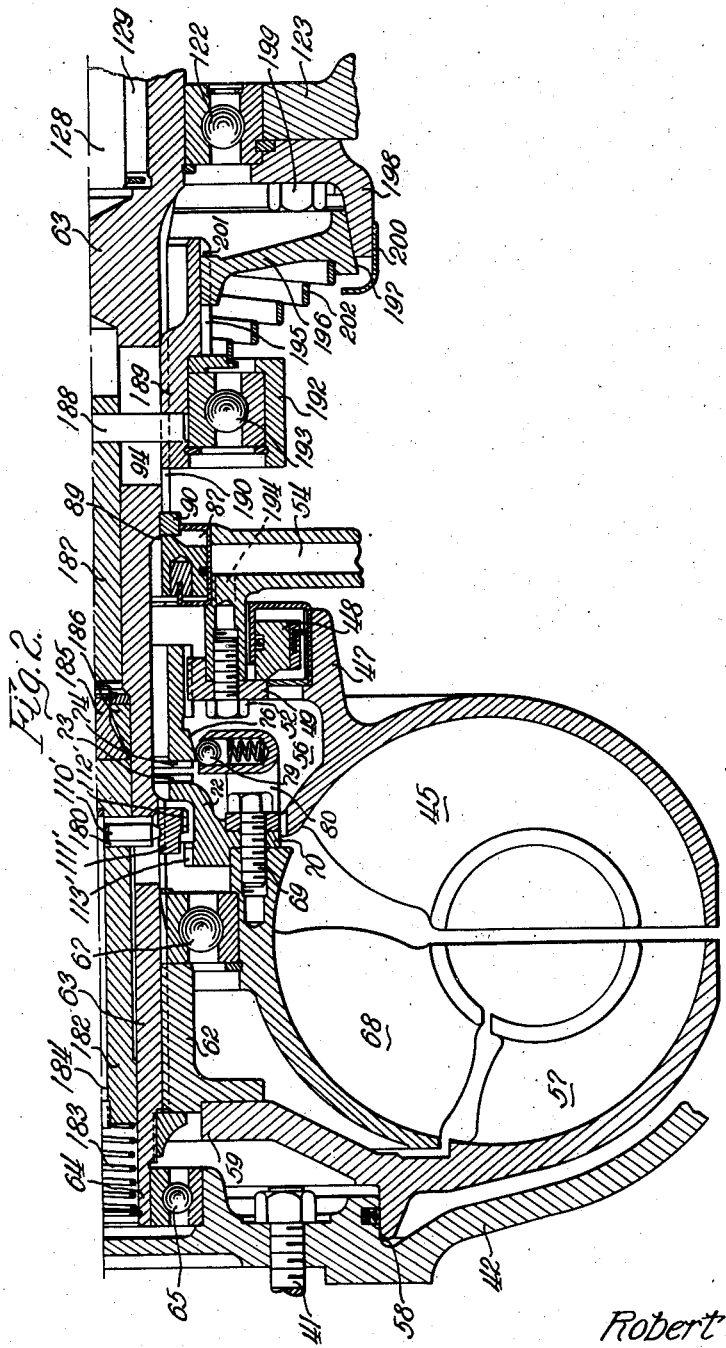

2,406,083

UNITED STATES PATENT OFFICE 2,406,083

TRANSMISSION

Robert Lapsley, Berrien Springs, Mich., assignor to Clark Equipment Company, Buchanan, Mich., a corporation of Michigan Original application July 10, 1943, Serial No. 494,439. Divided and this application February 23, 1944, Serial No. 523,773

5 Claims. (Cl. 60—54)

This invention relates to transmissions, and more particularly is concerned with a fluid torque converter for an automatically controlled transmission arranged to be operated as a fluid coupling under certain conditions.

The present application is a division of my copending application Serial No. 494,439, filed July 10, 1943.

The present invention is directed particularly to a transmission employing the combination of a fluid torque convertor and a change speed gear arrangement, the torque convertor providing infinitely variable torque multiplication in the varying gear ratios provided by the change speed gearing. In addition the torque convertor itself is capable of being shifted into position to function as a fluid coupling under certain conditions, this shift being effected automatically in accordance with speed and power requirements of the engine.

One of the primary objects of the present invention is to provide a power transmitting device consisting of a fluid drive which will operate as a fluid torque multiplier or fluid clutch in accordance with the control of the shift means, which shift means is automatically controlled at any time.

In addition to this the fluid drive construction is provided with means operative when the engine is idling for braking the drive shaft either to a stop or rotating it slightly in a reverse direction so as to remove any idling torque, thereby allowing gear changes to be effected without restriction or clash.

Another object of the present invention is to provide a fluid unit control which is automatically operable in accordance with power requirements of the engine for locking the fluid turbine and reaction members together to prevent torque multiplication and to produce in effect a two element fluid clutch which, upon movement of the automatic control means in the opposite direction, will operate a shift brake so as to stop rotation of the drive shaft and rotate it rearwardly to allow change speed shifts to be made without restriction or clash.

In a preferred form of the invention there is provided a fluid torque convertor which has means for changing the torque convertor to a fluid coupling and locking the turbine and reaction members for conjoint rotation. This means is automatically controlled through a remotely disposed control unit. In addition the transmission is provided with shift brake means which controls the driven shaft to hold it against engine torque when the convertor is idling for allowing pre-selection of forward or reverse drive without possibility of gear clashing or the necessity of overcoming the idling torque imposed on the gear faces.

Other objects and advantages of the present invention will appear more fully from the following detail description which, taken in conjunction with the accompanying drawings, will disclose to those skilled in the art the particular construction and operation of a preferred form of the present invention.

In the drawings:

Figure 1 is a sectional view through one form of the transmission showing in detail the fluid unit and shift brake mechanism; and Figure 2 is a sectional view corresponding to Figure 1 of a modified form of construction.

Referring now in detail to Figure 1, the crank shaft 40 of the engine is connected through studs 41 to a flywheel spider 42 carrying the starting ring gear 43 and also having bolted thereto as by means of studs 44 the driving or impeller member 45 of the fluid torque converter. The impeller 45 is provided with a series of fluid inlets 46 through which oil is forced under pressure into the interior of the impeller. The hub portion 47 of the impeller is provided with the seal means 48 sealing against the flange 49 of a bushing 50 bolted or otherwise suitably secured, as at 52, to a partition wall 53 of the fluid housing 6. The control unit for the fluid housing is carried in the housing member 7, and there is provided a passageway or fluid duct 54 connected by any suitable means to a source of fluid pressure, whereby oil flows through the duct 54 and thence through passageways 55 intermediate the studs 52 into the space 56 disposed within the hub portion of the impeller 45.

The turbine or driven member 57 of the torque converter has sealing engagement with the annular shoulder 58 of the spider 42, and also is provided with the hub portion 59 riveted as at 60 to a sleeve member 62 splined on the driven shaft 63 of the fluid unit. The shaft 63 is preferably hollow for at least a portion of its length, and has the reduced end 64 journalled by the bearings 65 in a suitable pilot recess in the hub portion of the spider 42. The turbine 57 is prevented from movement to the left on the splines 63 by means of the lock nut 66 threaded on the shaft. The opposite end of the sleeve 62 forms a stop for the bearing assembly 67 upon which is mounted the stator or reaction member 68 of the fluid torque converter, this stator member having bolted thereto as by means of studs 69 a sleeve member 70 having an extended inwardly flanged hub portion 72 provided with ratchet teeth 73.

The teeth 73 are adapted to engage corresponding ratchet teeth 74 splined on housing 50 as by means of helical splines. Oil holes 75 provide for flow of lubricating oil to this portion of the unit. The member carrying the teeth 74 is provided with a tapered external surface 76 adapted to be engaged by a plurality of spring pressed balls 79 carried by circumferentially spaced arms 80 carried by a ring member 82 bolted to the stator 68. Whenever the stator tends to rotate rearwardly, the pressure of the balls on the tapered surface feeds the splined member 74 inwardly to engage the ratchet teeth with teeth 73, locking the stator against reverse rotation. However, rotation of the stator 68 conjointly with the turbine 57 causes a reverse action, tending to move the teeth 74 out of engagement with the teeth 73 to allow free forward rotation with the stator.

The housing 7 is piloted in and securely bolted to the fluid unit housing 6 as by means of the studs 83, there being a suitable inspection opening 84 provided in the bottom of this housing. The inwardly directed flange 53 of the housing 7 has bolted thereto the member 51 which carries the brake drum 85 having a suitable oil retaining flange 86 pressed thereover. A suitable seal 87 is provided between the hub 88 of the member 51 and the shouldered portion 89 of the shaft 63 to prevent the escape of fluid from the torque converter unit into the housing 7. The annular seal ring 90 forming a part of this seal also functions as a stop for the helically coiled spring 92, which is biased between the ring 90 and the recessed part of a sleeve 93 splined for axial sliding movement on the shaft 63. The shaft 63 adjacent this point is provided with an elongated slot 94 through which extends a pin 95, this pin being secured in the sleeve 93 and engaging in a suitable slot 96 formed in a sliding pull rod 97 disposed within the bore of the shaft 63. The pull rod 97 is arranged to normally be pressed to the left by the spring 98 bearing at one end against the base of the bore in the shaft 63, and at the opposite end against the head end portion 99 of the pull rod. The sleeve 93 is provided with a helically splined external portion 100 upon which is mounted the correspondingly splined hub portion of a brake member 101 adapted to engage the brake surface 85. This member is normally pressed against a stop ring 103 by means of the spring 104, which spring is biased at its opposite end against the ring 105 carried on the sleeve 93 and forming one stop for a bearing assembly 106, the opposite side of the bearing being held against axial movement by the ring 107. The bearing 106 is provided with an annular yoke or collar 108 adapted to be engaged by a suitable shift mechanism operated by the foot brake. Depression of the brake pedal (not shown) moves the bearing assembly, and consequently the sleeve 93 to the left, as viewed in Figure 1, causing the brake 101 to engage the brake drum 85. Initial engagement therebetween provides a threading action, tending to rotate the sleeve 93 in a direction opposite to the normal rotation of shaft 63 so that the application of this brake will stop the rotation of the shaft when the torque converter is idling, and, upon further actuation of the pedal, will cause the sleeve 93 to effect through the threading action of the helical splines 100 a slight reverse rotation of the shaft to facilitate shifting of the gears in the transmission to select either forward speed or reverse drive by manual selection from the steering wheel. It will be noted that there is a resilient lost-motion connection between the brake 101 and sleeve 93, which provides a semi-self-energizing action for the brake so that once it engages, the tendency is to thread the sleeve 93 outwardly therefrom, but since the pedal is being depressed, the sleeve will actually effect slight reverse rotation of the shaft 63. This particular brake construction is shown more clearly and described in more detail in my copending application, Serial No. 480,714, filed March 26, 1943, and need not be described in detail herein.

The pin 95 carried by the sleeve 93 has free movement within the slot 94 of shaft 63 to facilitate operation of the brake. This movement is also provided in order to facilitate operation of the clutching means by which the torque converter is changed to a fluid coupling, without interfering with the brake operation.

In converting the torque multiplier to a fluid coupling, shifting of the sleeve 93 to the right causes the pin 95 to move to the right, thereby exerting a pull on rod 97 within shaft 63. The opposite end of rod 97 is provided with detent members 110 engaging in suitable recesses in the hub portion of a clutch gear 111 splined on shaft 63. The clutch gear 111 is provided with external clutch teeth 112 adapted to have clutching engagement with the teeth 113 carried by the hub of the member 72.

Consequently, upon being pulled to the right, the rod 93 causes the clutch member 111 to move into clutching engagement with the member 70 locking the stator 68 to the shaft 63 for conjoint rotation therewith. Since the turbine 57 is also splined to the shaft 63, it will be obvious that the two elements of the converter will be coupled for conjoint rotation, thereby changing the torque converter to a fluid coupling. The shaft 63 is provided with an elongated slot 114 to accommodate this movement of the clutch member. The slot 96 in pull rod 97 allows operation of the brake mechanism 101 without in any way affecting the clutch member, since this movement is in the opposite direction or to the left, and clearance is provided for this purpose. Preferably, a suitable oil seal ring 115 is interposed in the bore of the shaft 63 to prevent leakage of oil rearwardly through this bore. The spring 98, as will be noted, urges the pull rod 97 to the left, and normally tends to maintain the clutch disengaged unless shifting force is applied to the yoke 108.

Considering now the disclosure of Figure 2, it will be noted that in many respects the construction shown is similar to that shown in Figure 1, and consequently similar reference numerals are applied to corresponding parts. In this construction which is the showing of the torque converter and brake mechanism for facilitating shifting while the engine is idling, it will be noted that several modifications are made over the construction shown in Figure 1 in providing a slightly modified form of brake construction for changing the torque converter to a fluid coupling.

In this connection it should be noted that the teeth 113' on the clutch member 72 are disposed adjacent the bearings 67, while the teeth on the shifting pinion 111' are disposed in the space between the teeth 113' and the ratchet teeth 73—74, which latter teeth act as a one-way clutch for the stator or reaction member. These teeth are indicated at 112' and, upon movement of the shifting mechanism to the left as shown in Fig. 2, are adapted to mesh with the teeth 113' to lock the stator 68 for conjoint rotation with shaft 63 and consequently with the turbine or driven member 57. It will be noted that the pinion 111' is splined on the shaft 63 for conjoint rotation therewith, and is controlled by the pin 110' carried in the sleeve 180, which in turn is pressed into the sliding plunger 182 mounted in the counterbored portion of the shaft 63. A suitable spring 183 normally urges the plunger 182 to the right, holding the teeth 112' and 113' out of engagement. A suitable pin 184 holds the lock pin 110' in position, and is threaded into the outer end of the plunger 182. The plunger 182 has bearing against a spacer member 185 which in turn seats at the lower end of the bore of the shaft 63 against a stop member 186.

When the plunger 182 is moved to the left, the pin 110' carries the clutch teeth into engagement. This movement is effected by the rod 187 located within the shaft 63 and carrying a radially extending pin 188, which in turn engages a sleeve 189 carried on the splines 190 formed on a shouldered portion of the shaft 63. The sleeve 189 is shiftable to the left by means of a suitable shift member engaging the collar 192 carried by the bearing assembly 193. Movement of this shift mechanism results in clutching of the teeth 112' and 113' together. Upon movement of the shift mechanism in the opposite direction, the spring 183 produces disengagement of the clutch teeth, releasing the stator 68 so that it can become locked against the sleeve carried on the splined portion of the flange member 49 secured to the housing, thereby locking the stator against reverse rotation.

The fluid for the torque converter is introduced through the passageway 54 and thence through passageways 194, which alternate with the bolts or studs 52 to introduce the fluid into the chamber 56 from whence it flows into the interior of the converter.

The sleeve 189 is provided externally with the helically splined portion 195 upon which is mounted the brake spider 196. This spider has a brake surface 197 adapted to engage the internal braking surface of the drum 198, which is secured to the end wall of the converter housing as by means of studs 199. A suitable oil retaining member 200 is pressed over the drum 198 to retain oil on the braking surfaces, as described previously. The brake member 196 is normally urged against the stop 201 carried by the splines 195 by means of a spring 202, and when the brake drum is engaged and the spider 196 tends to stop rotating, further movement of the shifting mechanism causes the sleeve to be threaded through the hub of the spider on the helical splines, thereby causing slight reverse rotation of shaft 63 to facilitate shifting of the gears in the transmission.

It is to be understood that any suitable type of change speed transmission employing two or more gear ratios may be driven by the shaft 63 or the shaft 127, it being understood that normally a pinion on the outer end of this shaft will be employed for transmitting the driving torque of the shaft into the transmission gears.

In the normal use of the construction shown in Figures 1 and 2 there is provided a control unit which is responsive jointly to the speed and engine load conditions of the vehicle. This unit is preferably of the type disclosed in my copending parent application referred to above, although any similar control mechanism may be employed to provide the shifting effects required for changing the torque converter to a fluid coupling.

It is therefore believed apparent that I have provided a novel type of mechanism for automatically coupling the rotor and driven elements of the torque converter for conjoint rotation under certain conditions to produce a fluid coupling mechanism operating as a torque converter when these two elements are not clutched together.

I am aware that various changes may be made in certain details of design disclosed in the instant application, and I therefore do not intend to be limited except as defined by the scope and spirit of the appended claims.

I claim:

1. In a transmission, a housing containing a fluid unit and a transmission, said unit including an impeller, a stator free to turn in a forward direction, and a turbine, a shaft driven by said turbine, a sliding hub adjacent said stator and having ratchet teeth, said hub having helically splined engagement in said housing, means carried by said stator including ratchet teeth, and means carried by said stator engaging said hub and operable upon reverse rotation of said stator for engaging said ratchet teeth to prevent said rotation.

2. Means for clutching the stator of a torque converter to the driven shaft of said converter, comprising a first clutch member secured to the hub of said stator, a second clutch member splined to and slidable axially on said shaft within the hub of said stator, an actuator including a first plunger slidable axially within said shaft, a longitudinal slot in said shaft adjacent the hub of said stator, a second plunger in said shaft in endwise abutment with said first plunger and having radially projecting means movable in said slot for shifting said second clutch member into and out of engagement with said first clutch member, spring means normally holding said second plunger in inoperative position and means at the remote end of said first plunger for moving it against said spring means to shift said second plunger into operative position.

3. Means for controlling the stator of a torque converter to lock it against reverse rotation relative to an impeller member comprising a stationary element having an axially shiftable member in helically splined engagement therewith, a tapered surface on said member and a ratchet tooth portion on the end face thereof, said stator having a coacting ratchet tooth surface and having an extension overlying said tapered surface, and ball means carried by said extension and bearing on said tapered surface whereby upon rotation of said stator in reverse direction said axially shiftable member is moved axially on its splines into position to provide locking engagement between said ratchet tooth portions for locking said stator to said stationary element.

4. Means for controlling the stator of a torque converter to lock it against reverse rotation relative to an impeller comprising a stationary element having an axially shiftable member in helically splined engagement therewith, and located adjacent the hub of said stator, coacting oneway clutch means on said member and on the hub of said stator, an annular tapered surface on said member, and an extension on said hub stator overlying said surface and having ball means in pressure engagement with said surface whereby upon rotation of said stator in a reverse direction said ball means threads said shiftable member axially toward said hub to engage said clutch means for locking said stator to said stationary element.

5. Means for clutching the stator of a torque converter to the driven shaft thereof comprising a first clutch element secured to the hub of said stator, a second clutch element splined for axial movement on said shaft, said shaft having axially extending bores of different diameters, a first plunger shiftable in one of said bores from a remotely disposed point, a second plunger shiftable in the other of said bores and having means limiting its movement in one direction, spring means normally urging said second plunger in said one direction, and radial means carried by said second plunger engaging said second clutch element for shifting said second clutch element into clutching engagement upon movement of said first plunger against the end of said second plunger in a direction to compress said spring means.

ROBERT LAPSLEY.